(12) United States Patent
Kawakami et al.

(10) Patent No.: US 7,415,818 B2
(45) Date of Patent: Aug. 26, 2008

(54) CONTROL DEVICE OF INTERNAL COMBUSTION ENGINE

(75) Inventors: Teruaki Kawakami, Tokyo (JP); Keiichi Enoki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 17 days.

(21) Appl. No.: 11/333,508

(22) Filed: Jan. 18, 2006

(65) Prior Publication Data

US 2007/0044452 A1 Mar. 1, 2007

(30) Foreign Application Priority Data

Aug. 23, 2005 (JP) .......................... P2005-241257

(51) Int. Cl.
*F01N 3/00* (2006.01)
(52) U.S. Cl. .............................. 60/285; 60/274; 60/276; 60/277
(58) Field of Classification Search .................. 60/276, 60/277, 285, 299, 274
See application file for complete search history.

(56) References Cited

U.S. PATENT DOCUMENTS

| | | | | |
|---|---|---|---|---|
| 4,622,809 A | * | 11/1986 | Abthoff et al. | 60/274 |
| 5,293,740 A | * | 3/1994 | Heppner et al. | 60/276 |
| 5,438,826 A | * | 8/1995 | Blischke et al. | 0/276 |
| 5,609,023 A | * | 3/1997 | Katoh et al. | 60/276 |
| 5,678,402 A | * | 10/1997 | Kitagawa et al. | 60/276 |
| 5,758,490 A | * | 6/1998 | Maki et al. | 60/274 |
| 5,901,552 A | * | 5/1999 | Schnaibel et al. | 60/274 |
| 6,021,767 A | * | 2/2000 | Yasui et al. | 123/674 |
| 6,226,982 B1 | * | 5/2001 | Poggio et al. | 60/276 |
| 6,481,201 B2 | * | 11/2002 | Kako et al. | 60/285 |
| 6,631,611 B2 | * | 10/2003 | Shi et al. | 60/285 |
| 7,168,240 B2 | * | 1/2007 | Tani et al. | 60/285 |

FOREIGN PATENT DOCUMENTS

| | | |
|---|---|---|
| JP | 62-157251 A | 7/1987 |
| JP | 06-249028 A | 9/1994 |
| JP | 2003-314334 A | 11/2003 |

* cited by examiner

*Primary Examiner*—Thomas Denion
*Assistant Examiner*—Diem Tran
(74) *Attorney, Agent, or Firm*—Sughrue Mion, PLLC

(57) ABSTRACT

A control device of an internal combustion engine is capable of controlling an air-fuel ratio to be lean based on an activity of oxygen occlusion properties to provide improved three-way catalytic performance. The control device comprises: a three-way catalyst disposed in an exhaust passage of an internal combustion engine; a part for operating a basic fuel injection quantity; a part for operating a compensation amount of a basic fuel injection quantity so that an air-fuel ratio upstream from the three-way catalyst is coincident with a target air-fuel ratio; a part for operating a fuel injection quantity compensated with a basic fuel injection quantity compensation amount; a part for detecting an activity of oxygen occlusion properties of the three-way catalyst; and a part for setting the target air-fuel ratio based on the activity of oxygen occlusion properties.

11 Claims, 13 Drawing Sheets

CONTROL DEVICE OF INTERNAL COMBUSTION ENGINE

BACKGROUND OF THE INVENTION

1. Field of the Invention

The present invention relates to a control device of an internal combustion engine to adjust a fuel injection quantity based on an activity of oxygen occlusion properties of a three-way catalyst after cold start of the internal combustion engine.

2. Description of the Related Art

Current gasoline automobiles have a three-way catalyst mounted as an exhaust gas purification system. In the three-way catalyst, noble metal, that is, Pt (platinum), Pd (palladium), and Rh (rhodium) are supported. This three-way catalyst functions to convert harmful gas components of an automobile (HC, NOx, CO) to be harmless gases of $CO_2$, $H_2O$, and $N_2$ by the oxidation-reduction reactions, being a catalytic action. As is well known, such a relation as shown in FIG. 13 exists between an air-fuel ratio upstream from a three-way catalyst and catalytic conversion efficiency, and catalytic conversion efficiency is the highest where an air-fuel ratio is in the vicinity of a theoretical air-fuel ratio. To enhance the catalytic action, it is important to keep an exhaust gas at a theoretical air-fuel ratio. That is, with reference to FIG. 13, when controlling an air-fuel ratio in the window, the three-way catalyst acts as an effective conversion catalyst with respect to any gas. Additionally, in this diagram, HC refers to hydrocarbon, NOx nitrogen oxides, CO carbon monoxide, and V an oxygen concentration sensor output.

Further, the three-way catalyst contains therein Ceria (Ceria: cerium oxide) and the like as a promoter. Ceria or the like has properties of discharging oxygen in the case of being rich, and of absorbing oxygen in the case of being lean depending on air-fuel ratio upstream from the three-way catalyst as shown in FIG. 14. As a result, even in the case where an air-fuel ratio upstream from the three-way catalyst is varied and becomes out of a theoretical air-fuel ratio, an air-fuel ratio in the three-way catalyst comes to be a theoretical air-fuel ratio at all times, thus suppressing emissions of harmful gases. In addition, FIG. 14 shows behaviors of an air-fuel ratio upstream from a three-way catalyst, an amount of oxygen occlusion, and an air-fuel ratio in the three-way catalyst, respectively.

Furthermore, in the internal combustion engine, to regularly keep an air-fuel ratio in the vicinity of a theoretical air-fuel ratio, the air-fuel ratio feedback is carried out. In a general air-fuel ratio feedback system, an air-fuel ratio sensor (oxygen concentration sensor) is mounted at a place of an exhaust system as near to a fuel combustion chamber as possible, i.e., on the upstream side of a three-way catalyst to make the feedback control of fuel injection quantity of an engine so that combustion gas is at a theoretical air-fuel ratio. In spite of the air-fuel ratio feedback control, an air-fuel ratio is varied to be out of a theoretical air-fuel ratio at the time of acceleration/deceleration time. However, with a promoter of Ceria or the like, the internal part of a three-way catalyst is kept at a theoretical air-fuel ratio.

In this respect, at the time of acceleration of cold start of an internal combustion engine, since much fuel is adhered to a portion in the vicinity of an inlet port, thereby a fuel quantity to be sucked into a cylinder being reduced, an air-fuel ratio is generally set to be more rich than after warming-up. However, when the activity of a promoter of Ceria or the like of a three-way catalyst is not high enough, an occlusion amount of oxygen becomes insufficient, and HC conversion efficiency is reduced, eventually resulting in a disadvantage of worse HC emissions.

To cope with this, for example, the Japanese Patent Publication (unexamined) No. 157251/1987 discloses a control device consisting of control means for making such a feedback control that an air-fuel ratio of an internal combustion engine is a target air-fuel ratio, and temperature detection means for detecting a temperature of the internal combustion engine. In the case where a temperature of an internal combustion engine is not higher than a predetermined temperature, a target air-fuel ratio is set to be on the side of being more lean than a theoretical air-fuel ratio, thus suppressing worse HC emissions.

However, as to an activity of a noble metal and that of oxygen occlusion properties of a three-way catalyst after cold start of an internal combustion engine, as shown in FIG. 15, the activity of a noble metal is immediately increased, while the activity of oxygen occlusion properties are gradually increased. In the conventional air-fuel ratio control, since the air-fuel ratio is controlled to be in the vicinity of a theoretical air-fuel ratio despite that oxygen occlusion properties of a three-way catalyst is increased by degrees as shown in FIG. 12, an occlusion amount of oxygen is unlikely to increase. As a result, when an air-fuel ratio comes to be rich due to, e.g., acceleration, oxygen in the three-way catalyst is insufficient, and an air-fuel ratio in the three-way catalyst cannot be kept at a theoretical air-fuel ratio. In this respect, the inventor has noted that the emissions of HC are increased while a noble metal of the three-way catalyst being activated, as shown in FIG. 15. In addition, FIG. 12 shows problems in the conventional control, and indicates behaviors of an air-fuel ratio, oxygen occlusion properties and an amount of oxygen occlusion of a three-way catalyst, an air-fuel ratio in the three-way catalyst, and HC emissions, respectively.

Additionally, as described above, in the case where a temperature of the internal combustion engine is not higher than a predetermined temperature, just by the method of control of setting a target air-fuel ratio to be on the side of being more lean than a theoretical air-fuel ratio, no control is made considering activity transition of oxygen occlusion properties after cold start of an internal combustion engine. Thus, a problem exits in that the three-way catalyst is saturated with oxygen, and the emissions of NOx are increased.

SUMMARY OF THE INVENTION

The present invention was made to solve problems as described above, and has an object of obtaining a control device of an internal combustion engine capable of providing an improved three-way catalytic performance in the activity transition of oxygen occlusion properties of a three-way catalyst.

A control device of an internal combustion engine according to the invention includes:

a three-way catalyst disposed in an exhaust passage of an internal combustion engine;

basic fuel injection quantity operation means for operating a basic fuel injection quantity;

fuel injection quantity compensation amount operation means for operating a compensation amount of the mentioned basic fuel injection quantity so that an air-fuel ratio upstream from the mentioned three-way catalyst is coincident with a target air-fuel ratio;

fuel injection quantity operation means for operating a fuel injection quantity that is obtained by the compensation of the mentioned basic fuel injection quantity with the mentioned basic fuel injection quantity compensation amount;

oxygen occlusion properties activity detection means for detecting an activity of oxygen occlusion properties of the mentioned three-way catalyst; and target air-fuel ratio operation means for setting the mentioned target air-fuel ratio based on the activity of oxygen occlusion properties that is obtained by the mentioned oxygen occlusion properties activity detection means.

In the control device of an internal combustion engine of above arrangement according to the invention, it is possible to provide an improved catalytic performance in the activity transition of oxygen occlusion properties of a three-way catalyst. In the activity transition of oxygen occlusion properties of a three-way catalyst, an actual air-fuel ratio is controlled to be lean, an excess oxygen is fed into the three-way catalyst more actively than at the time of a theoretical air-fuel ratio, and an occlusion amount of oxygen is made to increase, thereby enabling to absorb rich fluctuation due to acceleration, and to keep the internal part of a three-way catalyst at the theoretical air-fuel ratio. Consequently, it comes to be possible to provide an improved catalytic action while suppressing worse NOx emissions, thus making it possible to suppress worse HC emissions.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
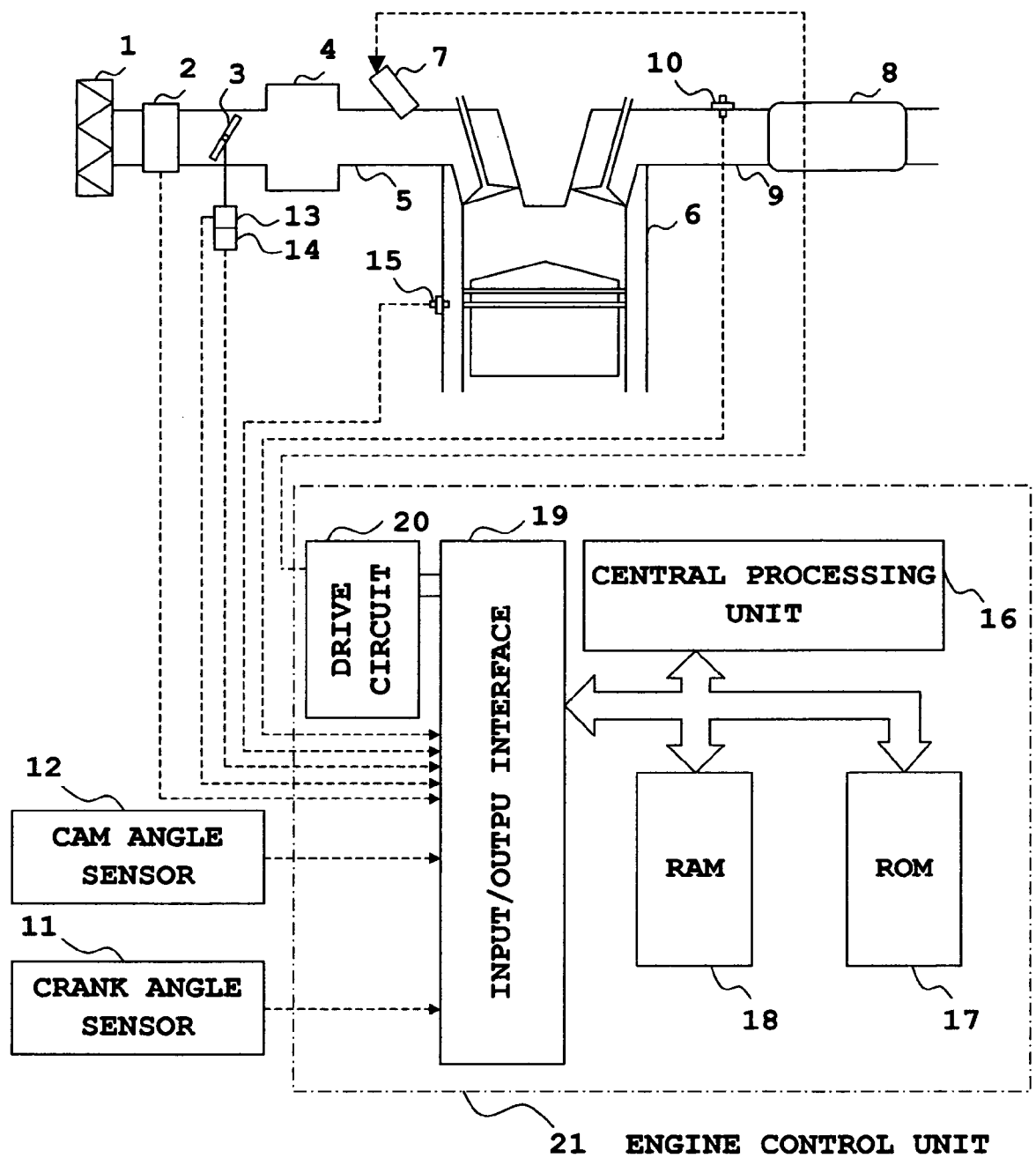
FIG. 1 is a schematic view showing a control device of an internal combustion engine according to the present invention.

FIG. 1 is a schematic view showing an example of the case where a control device of an internal combustion engine according to a first preferred embodiment of the invention is applied to an air-fuel ratio control device of an automobile internal combustion engine. With reference to FIG. 1, reference numeral 1 designates an engine body; numeral 5 designates an intake pipe connected to an inlet port of the engine 6; and numeral 9 designates an exhaust pipe connected to an exhaust port. The intake pipe 5 is connected to an intake passage via a surge tank 4. An air cleaner 1 has a filter functioning to remove dust contained in the air to be sucked. An airflow sensor 2 is, for example, a hot wire-type airflow sensor, which generates a voltage signal corresponding to mass and flow rate of intake air. A throttle valve 3 is in cooperation with an accelerator pedal, not shown, and adjusts the intake air qunatity. Further, a throttle valve-opening sensor 13 is disposed near the throttle valve 3. This throttle valve-opening sensor 13 contains, for example, a potentiometer, and detects throttle valve openings. Numeral 14 designates an idle switch, which detects the complete closure of a throttle valve.

A fuel injection valve 7 is located at each cylinder of the intake pipe 5. These fuel injection valves 7 are opened in response to signals of an ECU (engine control unit) 21, and serve to inject a pressurized fuel to inlet ports of respective cylinders. The control of a fuel injection quantity as to the fuel injection valves 7 will be described later. A catalytic converter 8 that contains therein a three-way catalyst is mounted on an exhaust pipe (exhaust passage) 9, and three components of HC, NOx, and CO in the exhaust gas can be purified at the same time. Furthermore, an air-fuel ratio sensor 10 is located upstream from the catalytic converter 8. This air-fuel ratio sensor 10 can linearly detect an air-fuel ratio from concentration of oxygen contained in the exhaust gas.

A crank angle sensor 11 outputs a pulse signal at intervals of a predetermined rotation of a crankshaft of the engine 6. A cam angle sensor 12 outputs a pulse signal at intervals of a predetermined rotation of a camshaft of the engine 6. For example, the crank angle sensor 11 outputs a pulse for detecting a rotational angle at intervals of 10° of a crank rotational angle. The cam angle sensor 12 outputs different signals with respect to respective cylinders, so that a cylinder can be specified in combination with signals of the crank angle sensor 11. A water temperature senor 15 that outputs a voltage signal corresponding to a temperature of an engine cooling water is located in a water jacket of a cylinder block of the engine 6.

On the other hand, the ECU 21 is provided inside the automobile. This ECU consists of an input/output interface 19, a central processing unit 16, a ROM 17, a RAM 18, and a drive circuit 20. Various sensors or switches other than those described above are also connected to the input side of the ECU 21. Various sensor outputs are A/D converted thorough the interface to be fetched in the ECU. Further, various actuators such as ignition coil or ISC valve, not shown, are connected to the output side other than the fuel injection valve 7. Results obtained by the operation on the basis of detection information of various sensors or switches are outputted, thus enabling to control the actuators.

Figure 2:
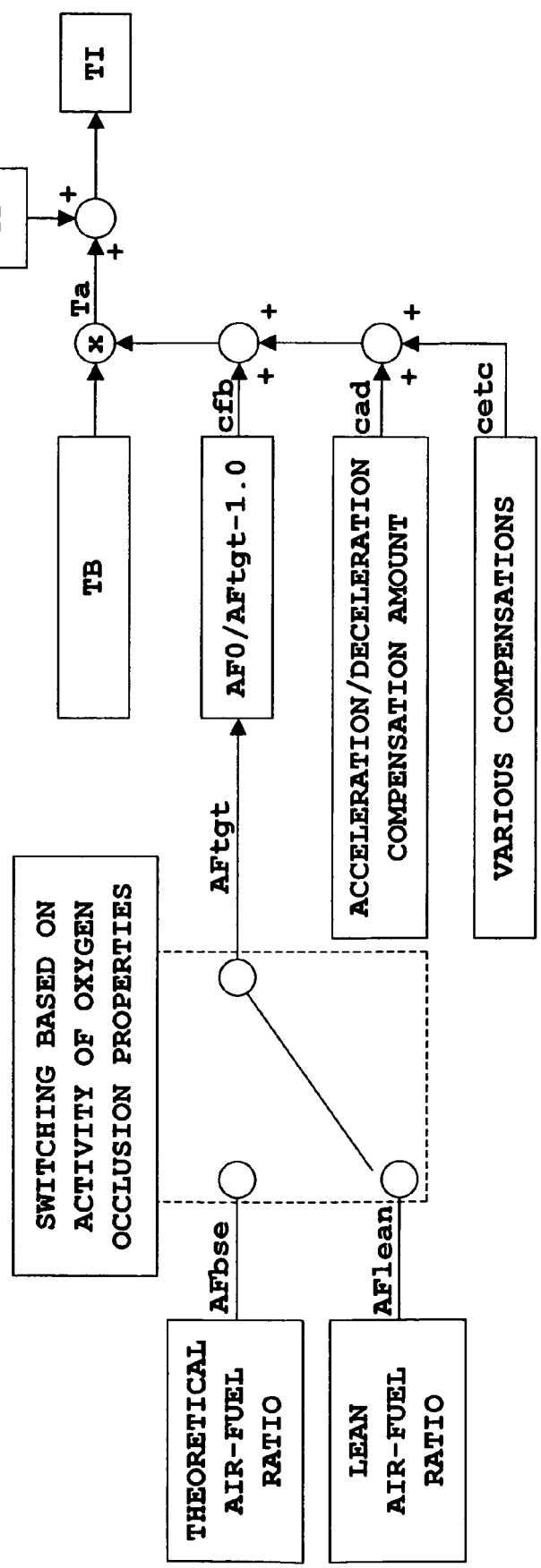
FIG. 2 is a block diagram showing a fuel injection control device according to the invention.

The fuel injection control according to the first embodiment is described with reference to FIG. 2. FIG. 2 is a block diagram showing a fuel injection control device. In the ECU 21, outputs from the airflow sensor 2 are A/D converted to be read, and an intake air quantity in a signal section of the crank angle sensor 11 is integrated to calculate an intake air quantity A/NO in one intake stroke. To simulate response delay in the surge tank, the multiplication of the intake air quantity A/NO is made with a primary filter to operate the intake air quantity A/N flowing in the cylinder. With respect to A/N obtained like this, a basic fuel injection time period TB is calculated so as to be at a theoretical air-fuel ratio (basic fuel injection quantity operation means).

Subsequently, in the activity transition of oxygen occlusion properties of a three-way catalyst, a target A/F: Aftgt (target air-fuel ratio) is switched at the appropriate times to a theoretical air-fuel ratio setting AFbse and to a lean air-fuel ratio setting AFlean having been preliminarily determined based on an activity of oxygen occlusion properties of a three-way catalyst (target air-fuel ratio operation means), and a fuel compensation amount: cfb is calculated (fuel injection quantity compensation amount operation means). Then, with respect to the change in airflow rate at the time of acceleration/deceleration, an acceleration/deceleration compensation amount cad is operated. This operation is a multiplication of a water temperature compensation that is set to be larger as an engine cooling water temperature having been detected by the water temperature sensor 15 comes to be lower. Furthermore, the other various fuel compensation amounts cetc are operated.

Using compensation amounts obtained in this manner, a basic fuel injection time period TB is compensated, and an active fuel injection time period Ta is calculated (fuel injection quantity operation means). Furthermore, a reactive injection time period TD to make the compensation of a valve-opening delay time period of the fuel injection valve 7 is added, an actual fuel injection pulse time period TI is calculated, and thereafter the fuel injection valve 7 is driven via the drive circuit 20.

As a result of the arrangement as described above, in the activity transition of oxygen occlusion properties of a three-way catalyst, it becomes possible to optimize at all times an oxygen occlusion in a catalyst by switching a target A/F: Aftgt at the appropriate times based on an activity of oxygen occlusion properties of a three-way catalyst. Even in the case of the occurrence of an air-fuel ratio rich due to acceleration/deceleration compensation amount, etc., it is possible to keep the internal part of a catalyst at a theoretical air-fuel ratio, and to hold the maximized catalytic performance.

Figure 3:
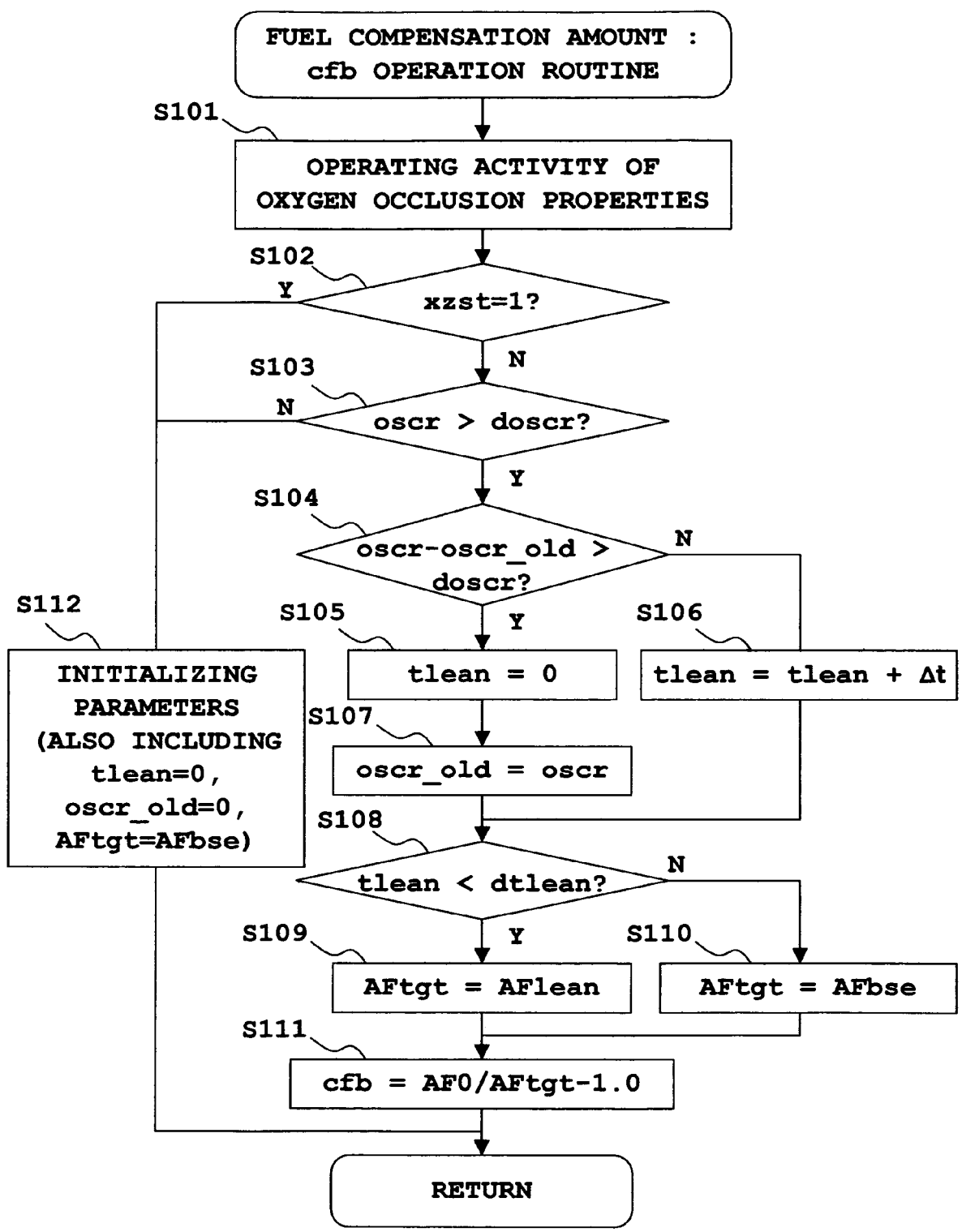
FIG. 3 is a flowchart showing a fuel injection quantity compensation amount operation routine for use in a first preferred embodiment and a second preferred embodiment.

The first embodiment is hereinafter described in detail with reference to a flowchart. FIG. 3 is a flowchart showing a fuel injection quantity compensation amount operation routine to be carried out at intervals of a predetermined time period. First, in Step S101, an activity (oscr) of oxygen occlusion properties of a three-way catalyst is calculated by oxygen occlusion properties activity operation processing as described below. Supposing that a starting mode flag (xzst) with which a starting mode is determined until above a predetermined engine speed after the start-up of an engine is set in Step S102, parameters are initialized in Step S112, returning to the main routine. Supposing that the starting mode flag is reset, the program proceeds to Step S103, in which it is determined whether or not an activity (oscr) of oxygen occlusion properties of a three-way catalyst comes to be not less than a predetermined value (doscr). In the case of being not more than a predetermined value, since an activity is insufficient, parameters are initialized in Step S112, returning to the main routine.

In comparison, when it is determined to be at not less than a predetermined value, to determine whether or not oxygen occlusion properties of a three way catalyst is increased by a predetermined percentage in Step S104, it is determined whether or not a difference between an activity (oscr) of oxygen occlusion properties of the catalyst having been calculated in Step S101 and the last value (oscr_old) having been stored in Step S107 is not less than a predetermined value (doscr). In the case of being determined to be not less than a predetermined value, a lean determination timer (tlean) is reset in Step S105. On the other hand, in the case of being determined to be not more than a predetermined value, the lean determination timer (tlean) is caused to increase an operation time period interval Δt at the time of executing the routine.

Next, it is determined in Step S108 whether or not a value of the lean determination timer (tlean) is not more than a predetermined time period (dtlean). In the case of being not more than a predetermined time period, a target A/F (AFtgt) is set to be a lean air-fuel ratio (AFlean) in Step S109, and an air-fuel ratio is made lean in a predetermined time period (dtlean) after oxygen occlusion properties of a catalyst has increased by a predetermined percentage. In the case where it is determined that not less than a predetermined time period has passed, the program proceeds to Step S110, in which a target A/F (AFtgt) is a theoretical air-fuel ratio (AFbse), being set to be in the vicinity of a theoretical air-fuel ratio. Finally, in Step S111, a fuel compensation amount cfb with respect to a basic fuel injection time period TB is operated, returning to the main routine. In Step S111, AF0 is a theoretical air-fuel ratio, being set to be, for example, AF0=14.5.

In addition, in the fuel injection quantity compensation amount operation routine of FIG. 3, when an activity of oxygen occlusion properties rises and reaches the saturation level, it is determined at all times to be not more than a predetermined value in Step S104. Then the program goes through Steps S106 and S108, and in Step S110, a target air-fuel ratio comes to be a theoretical air-fuel ratio from then onward, shifting to the warming-up state of an engine.

Now, the oxygen occlusion properties activity operation processing in Step S101 according to the first embodiment will be described in detail with reference to a flowchart shown in FIG. 4. First, supposing that a starting mode flag (xzst) is set in Step S201, parameters including an integrated value (Σqa) of air quantity as described later are initialized in Step S203, returning to the fuel compensation amount operation routine. On the other hand, supposing that the flag is reset, the program proceeds to Step S202, in which an air flow rate qa having been operated in the ECU 21 based on output signals from the airflow sensor 2 is read. It is preferable that an airflow rate qa is calculated with an engine speed and a boost pressure.

Figure 5:
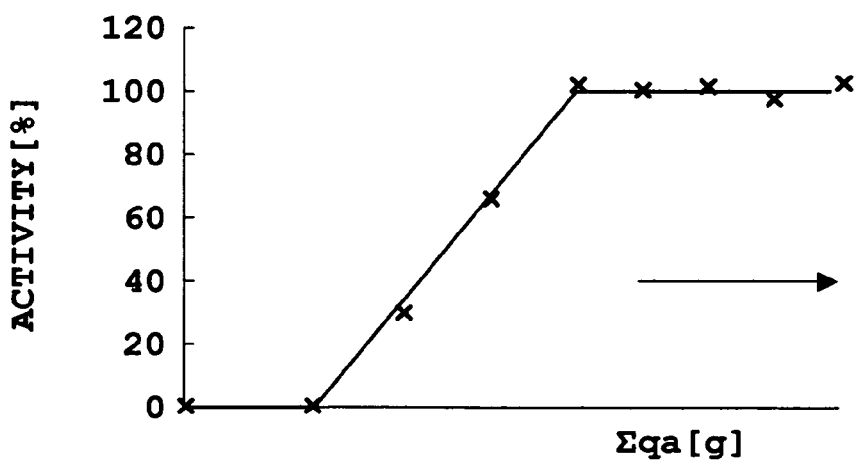
FIG. 5 is a characteristic chart showing the relation between an integrated value of air quantity and an activity of oxygen occlusion properties of a three-way catalyst.

Thereafter, the program proceeds to Step S204, in which an integrated value (Σqa) of air quantity is calculated from an airflow rate qa having been read and an operation time period interval Δt at the time of executing this routine. Subsequently, in Step S205, an activity (oscr) of oxygen occlusion properties of a three-way catalyst is calculated from the integrated value (Σqa) of air quantity based on a map shown in FIG. 5, returning to the fuel compensation amount operation routine. An activity of a three way catalyst (Ceria) has a correlation with the integrated value (Σqa) of air quantity as shown in FIG. 5, and an activity of oxygen occlusion properties of a three say catalyst is increased in accordance with the integrated value of air quantity after the start-up of an internal combustion engine.

As described above, oxygen occlusion properties activity detection means operates an activity of oxygen occlusion properties from an integrated value of intake air quantity. Since an integrated value of intake air quantity in correlation with an activity of oxygen occlusion properties is used, an activity of oxygen occlusion properties of a three-way catalyst can be calculated with accuracy.

Figure 4:
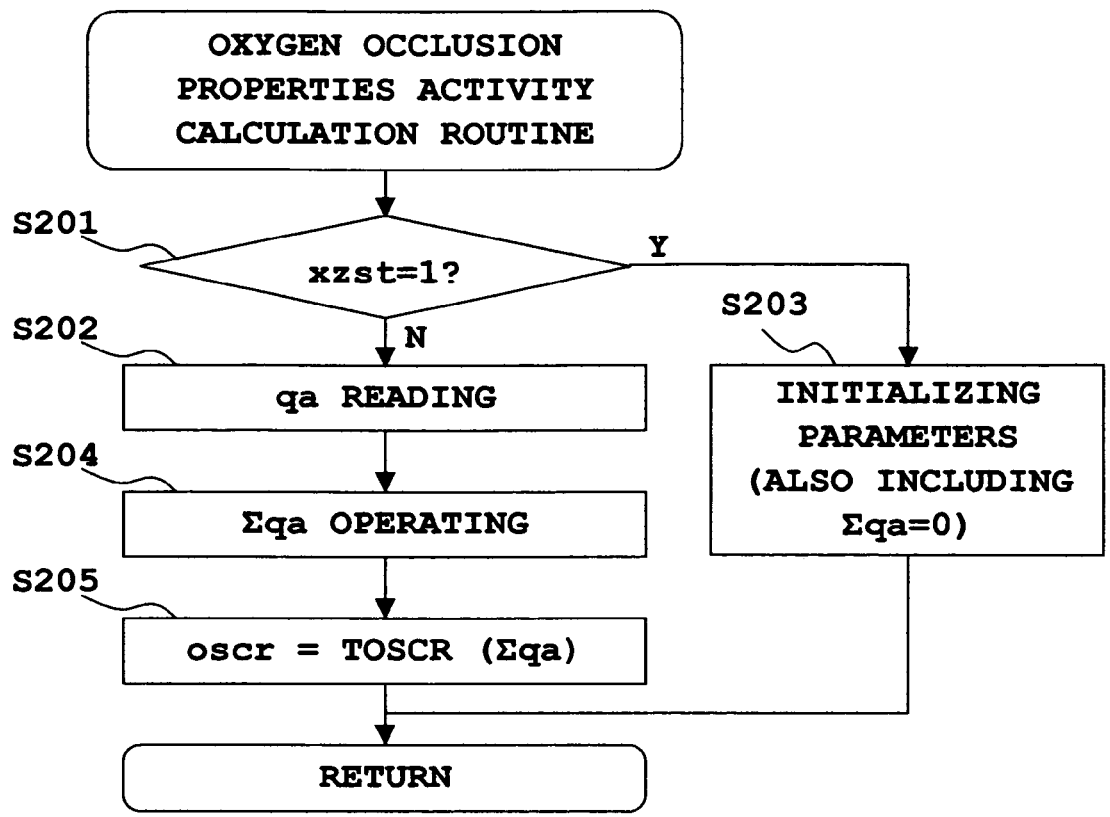
FIG. 4 is a flowchart showing an oxygen occlusion properties activity operation routine for use in the first embodiment.
Figure 6:
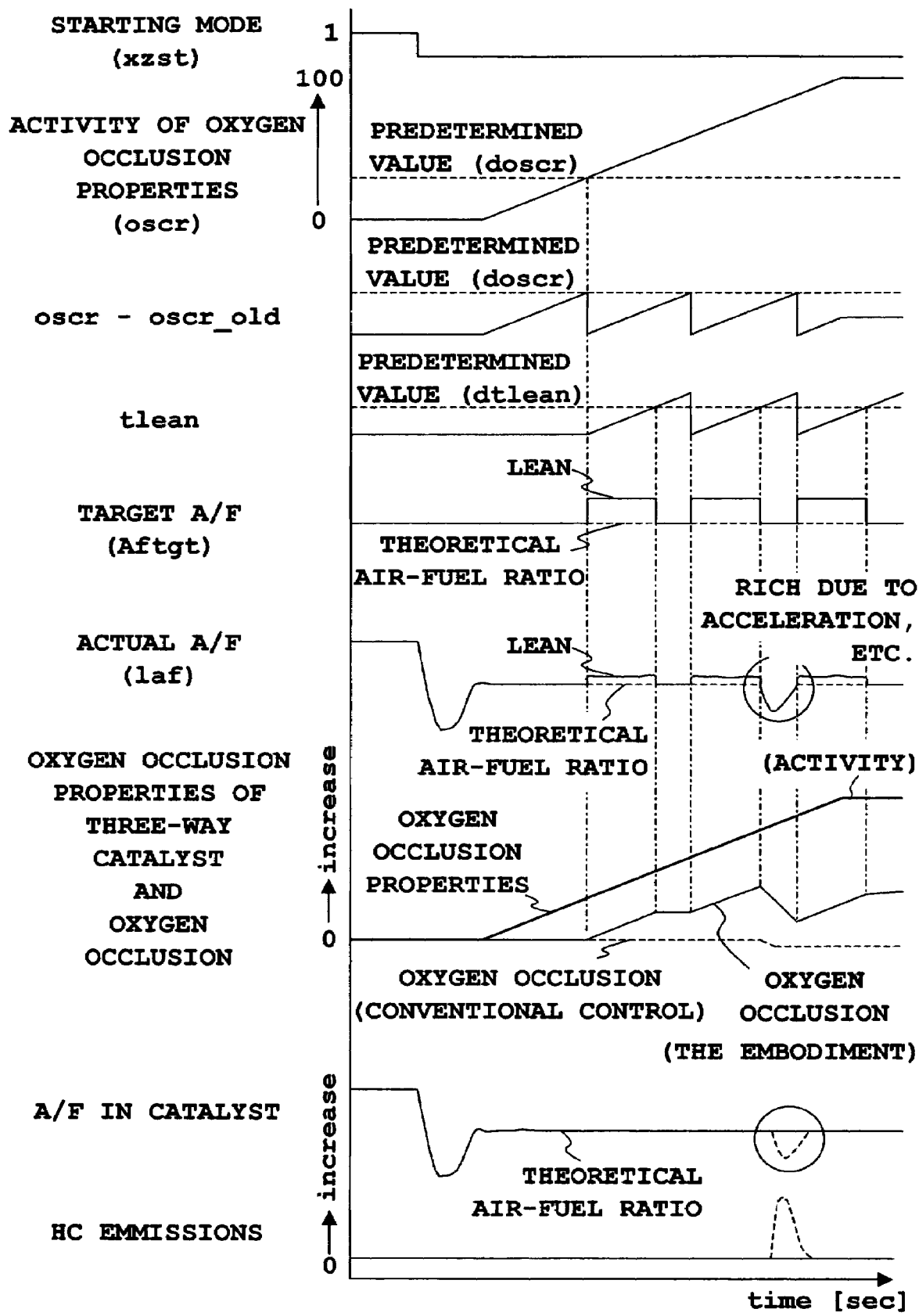
FIG. 6 is a timing chart for explaining operations of the first embodiment and the second embodiment.

Results obtained by the execution of the flowcharts of FIGS. 3 and 4 are now described with reference to a timing chart explaining operations shown in FIG. 6. The conventional control indicated by the dotted lines is an air-fuel ratio control in the vicinity of a theoretical air-fuel ratio. When an oxygen occlusion is not increased much and an air-fuel ratio comes to be rich due to disturbance, oxygen occluded in the three-way catalyst becomes dried up, and A/F in the three-way catalyst comes to be rich, resulting in worse HC emissions. In contrast, according to this first embodiment, a target A/F (AFtgt) is set to a lean air-fuel ratio (AFlean) during a predetermined time period (dtlean) at time points of a predetermined increase in activity of oxygen occlusion properties of a three-way catalyst, and an actual A/F is made lean, thereby causing an oxygen supply to increase. Thus, it becomes possible that occlusion amounts of oxygen in the three-way catalyst are controlled to be appropriate amounts based on the oxygen occlusion properties. Oxygen that is occluded in the three-way catalyst is sufficient even in the case of the occurrence of disturbance while suppressing worse NOx emissions due to oxygen saturation in the three-way catalyst, so that worse HC emissions can be suppressed.

As described above, according to the first embodiment, a target air-fuel ratio is set to be leaner than a theoretical air-fuel ratio in a predetermined period at time points of a predetermined increase in activity of oxygen occlusion properties, and the appropriate amount of oxygen can be supplied to the three-way catalyst. Consequently, it is possible to provide improved catalytic action despite the occurrence of a rich air-fuel ratio due to, e.g., acceleration while suppressing worse NOx emissions, thus enabling to suppress worse HC emissions.

Embodiment 2

In the second embodiment, the construction of an internal combustion engine shown in FIG. 1 and the fuel injection control shown in FIG. 2 are the same as in the foregoing first embodiment. Further, on the basis of the flowchart shown in FIG. 3 according to the first embodiment, a target A/F (AFtgt) is set to be a lean air-fuel ratio (AFlean) based on an activity state of oxygen occlusion properties, whereby oxygen is actively supplied into a three-way catalyst. Thus, even in the case of the occurrence of being rich due to disturbance, it is possible to suppress worse HC emissions. While according to the first embodiment, in the oxygen occlusion properties activity operation in Step S101 of FIG. 3, an activity of oxygen occlusion properties of a three-way catalyst is calculated from an integrated value (Σqa) of air quantity; according to the second embodiment, an activity of oxygen occlusion properties of a catalyst is calculated based on an integrated value (Σqa) of an active fuel injection time period Ta corresponding to a fuel injection quantity to be actually injected from the fuel injection valve 7.

Figure 7:
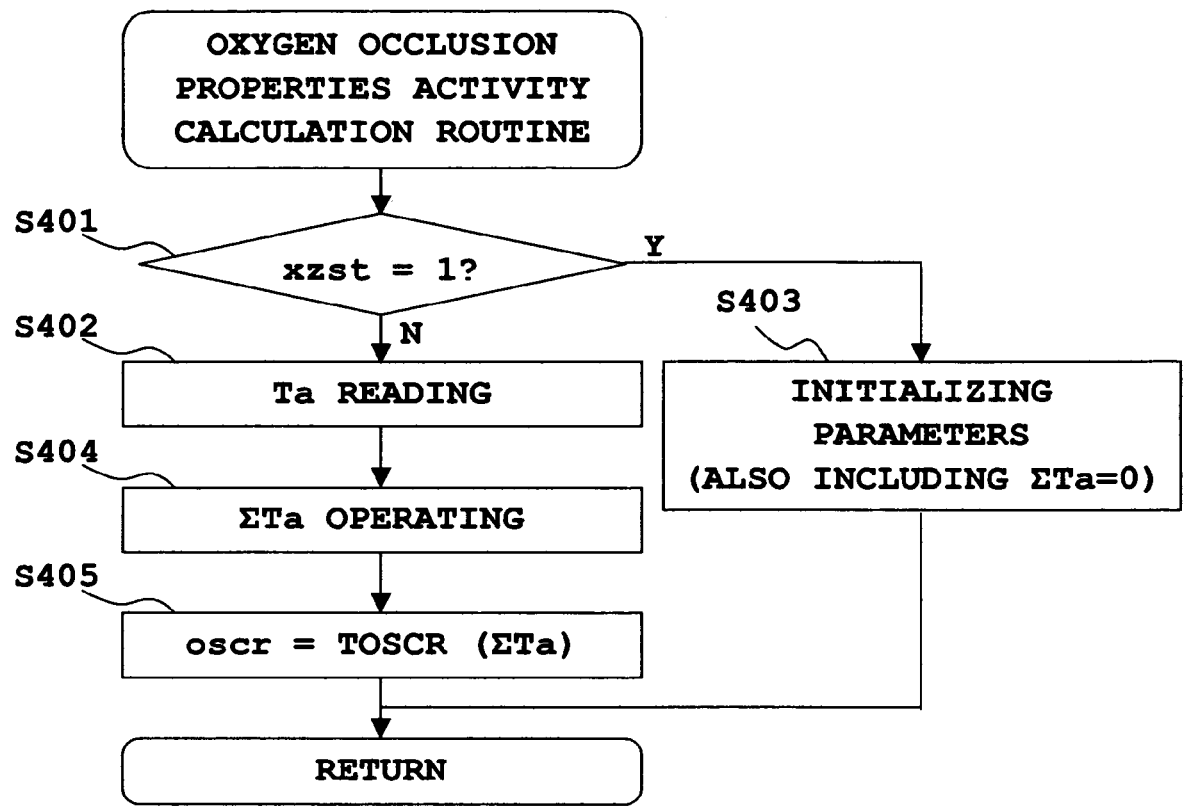
FIG. 7 is a flowchart showing an oxygen occlusion properties activity operation routine for use in the second embodiment.
Figure 8:
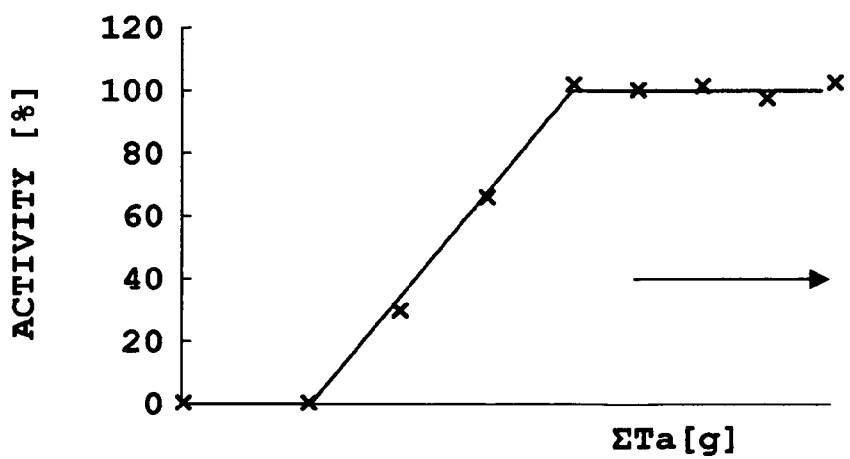
FIG. 8 is a characteristic chart showing the relation between an integrated value of fuel injection quantity and an activity of oxygen occlusion properties of a three-way catalyst.

The oxygen occlusion properties activity operation according to the second embodiment is described with reference to FIG. 7. First, supposing that a starting mode flag (xzst) is set in Step S401, parameters including an integrated value (Σqa) of active fuel injection time periods Ta as described later are initialized in Step S403, returning to the fuel compensation amount operation routine. On the other hand, supposing that no flag is set, the program proceeds to Step S402, in which an active fuel injection time period Ta having been operated in the ECU 21 is read. Thereafter, the program proceeds to Step S404, in which an integrated value (Σqa) of active fuel injection time periods Ta is calculated from an active fuel injection time period Ta having been read and an operation time period interval Δt at the time of executing this routine. Next, in Step S405, an activity (oscr) of oxygen occlusion properties of the three-way catalyst is calculated from the integrated value (Σqa) of active fuel injection time periods Ta on the basis of a map shown in FIG. 8, returning to the fuel compensation amount operation routine. An activity of a three-way catalyst (Ceria) is in correlation with the integrated value (Σqa) of active fuel injection time periods Ta as shown in FIG. 8. Further, an activity of oxygen occlusion properties of a catalyst is increased in accordance with an integrated value of active fuel injection time periods after the start-up of an internal combustion engine.

As described above, according to the second embodiment, an activity of oxygen occlusion properties is operated from an integrated value of fuel injection quantity that is in correlation with an activity of oxygen occlusion properties, thereby enabling to calculate an activity of oxygen occlusion properties with accuracy. As a result, that is, as a result of carrying out the flowcharts of FIGS. 3 and 7, the same operation and effect as in the foregoing first embodiment shown in FIG. 6 can be obtained.

Embodiment 3

Figure 9:
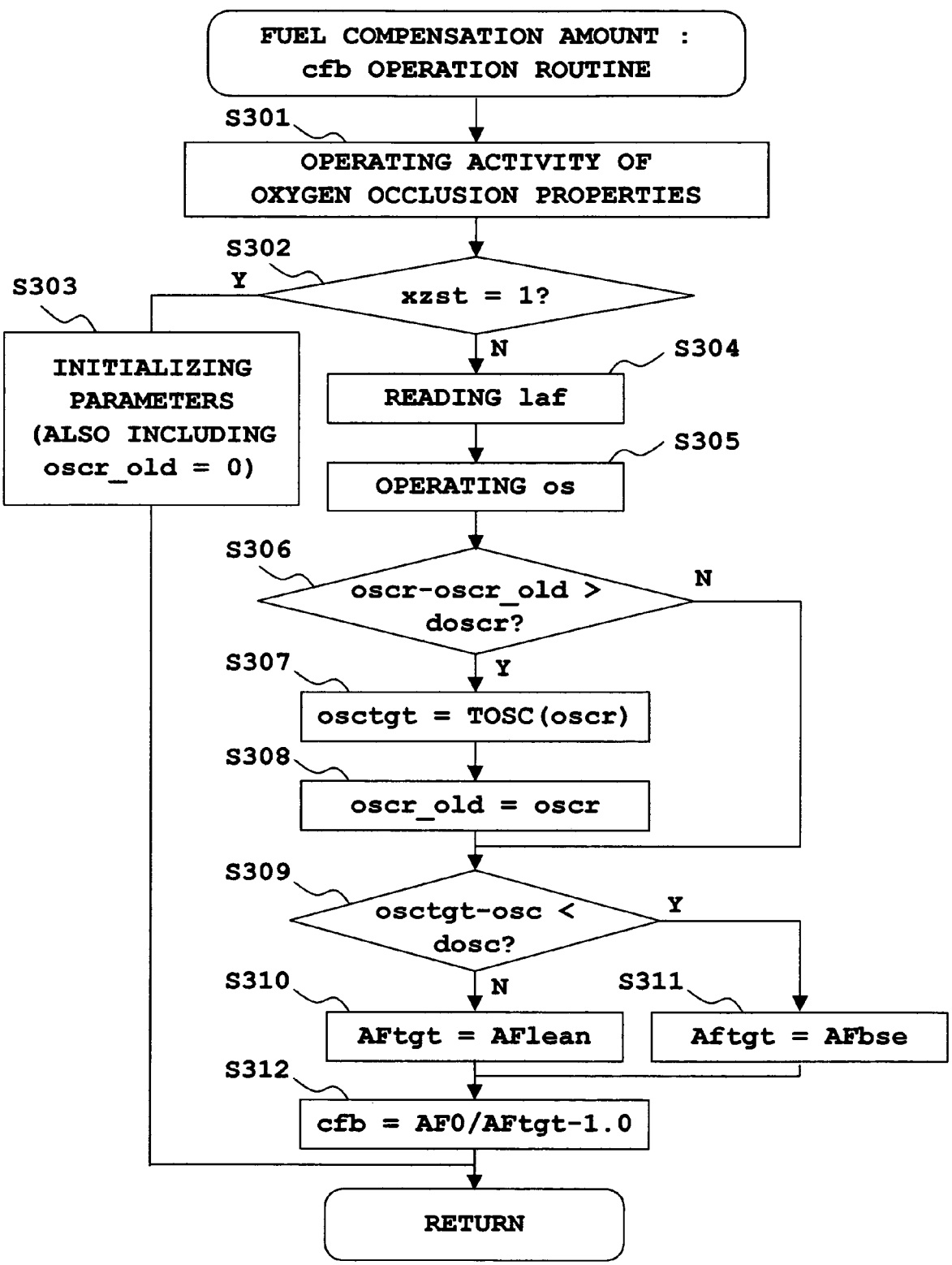
FIG. 9 is a flowchart showing a fuel injection quantity compensation amount operation routine for use in a third embodiment.

Now, a third embodiment is described referring to FIG. 9. FIG. 9 is a flowchart showing the fuel injection quantity compensation amount operation routine. First, in Step S301, by the oxygen occlusion properties activity operation processing with the use of an integrated value (Σqa) of air quantity or an integrated value (ΣTa) of active fuel injection time periods Ta as described above, an activity of oxygen occlusion properties of a three-way catalyst is calculated. Next, supposing that a starting mode flag (xzst) is set in Step S302, parameters including the last value (oscr_old) of an activity of catalytic oxygen occlusion properties as described later are initialized in Step S303, returning to the main routine. On the supposition of not being set, an air-fuel ratio (Iaf) that is detected by the air-fuel ratio sensor 10 is read in Step S304. In Step S305, an oxygen supply (os) to the three-way catalyst is obtained from an airflow rate (qa) that is obtained in Step S301 and an air-fuel ratio (Iaf) that is detected in Step S304. This oxygen supply (os) is obtained with the following expressions.

$$OS(n)\ [g] = OS(n-1)\ [g] + \Delta OS(n)\ [g]$$

$$OS(n)\ [g] = \Delta A/F(n) \div A/F0 \times qa(n)\ [g/s] \times O_2 \times \Delta T[s]$$

ΔA/F(n): Iaf−A/F0
A/F0: theoretical air-fuel ratio (for example, 14.5)
qa(n) [g/s]: airflow rate
$O_2$: oxygen weight ratio in air (for example, 0.21)
ΔT: sampling period ΔA/F(n) may be obtained from a target A/F (AFtgt) instead of an air-fuel ratio (Iaf).

Figure 10:
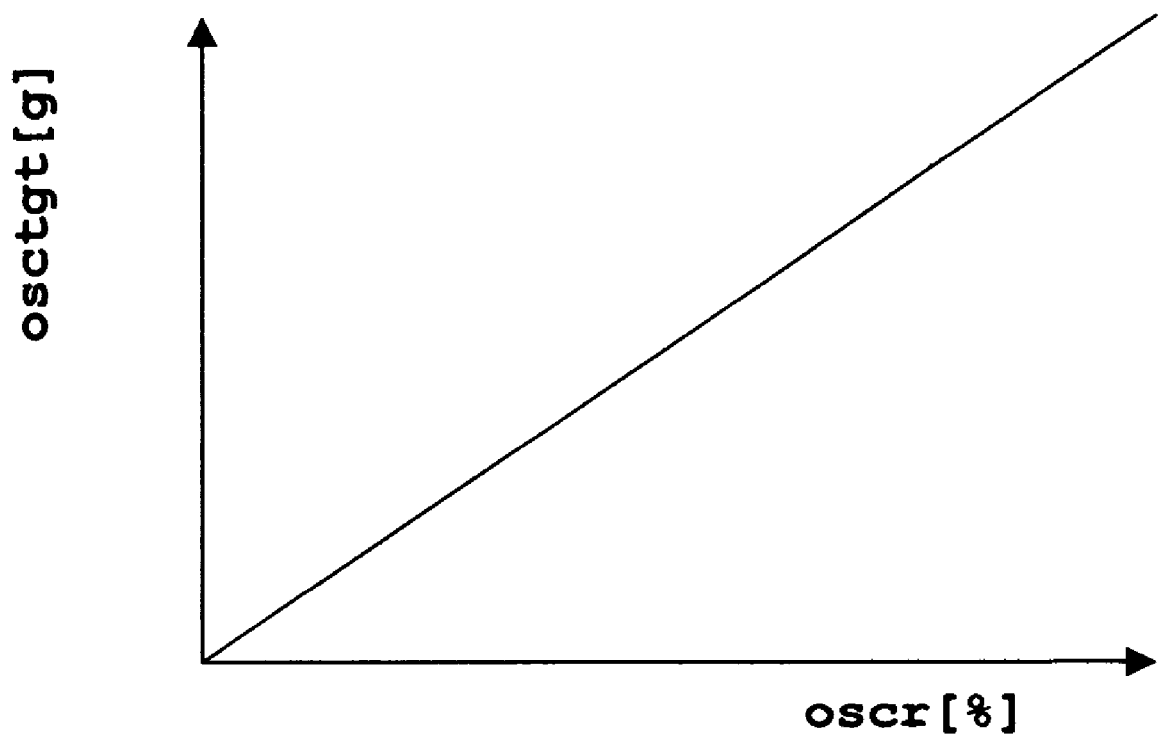
FIG. 10 is a characteristic chart showing the relation between an activity of oxygen occlusion properties of a catalyst and a target oxygen supply.
Figure 11:
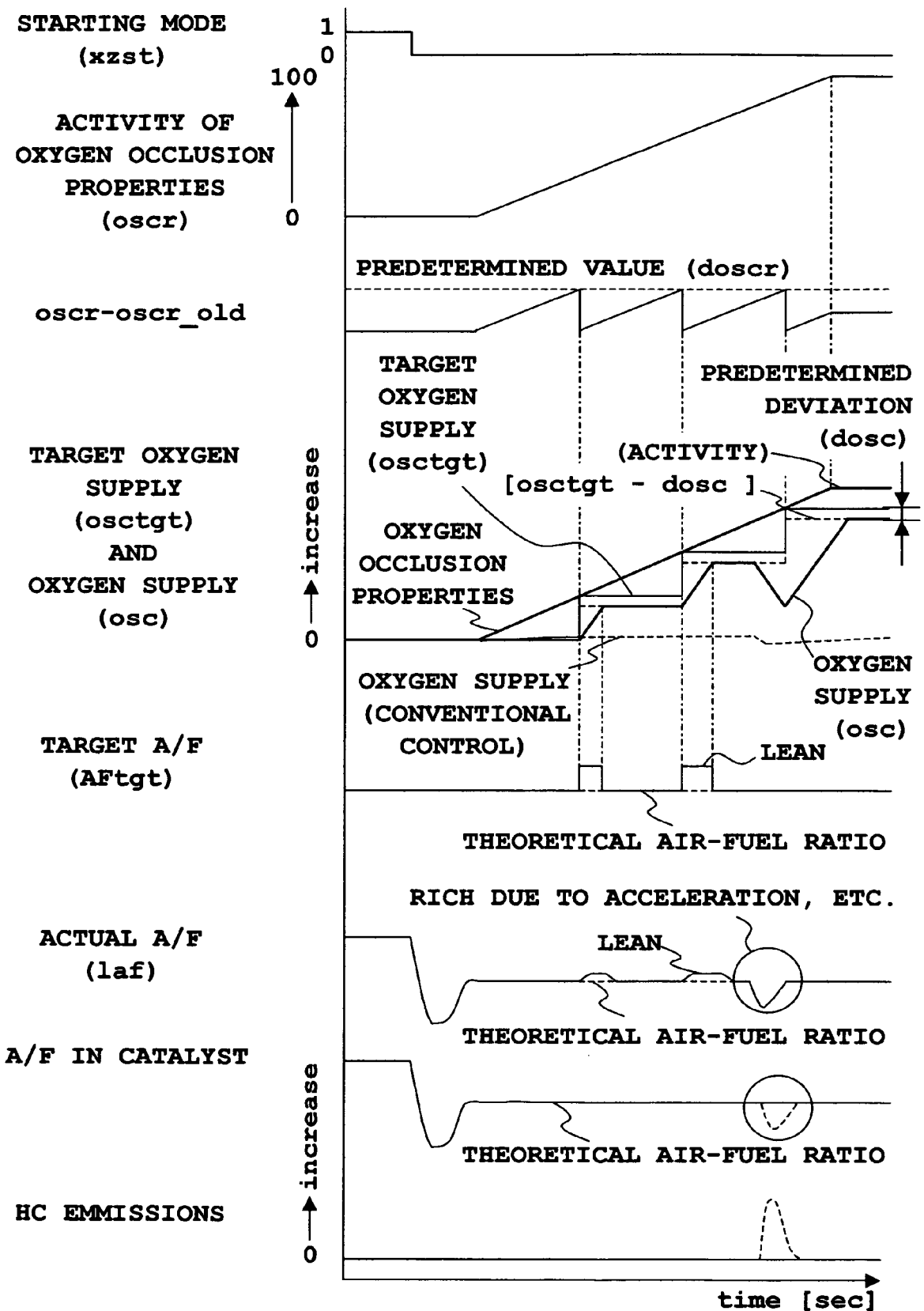
FIG. 11 is a timing chart for explaining the operation of the third embodiment.
Figure 12:
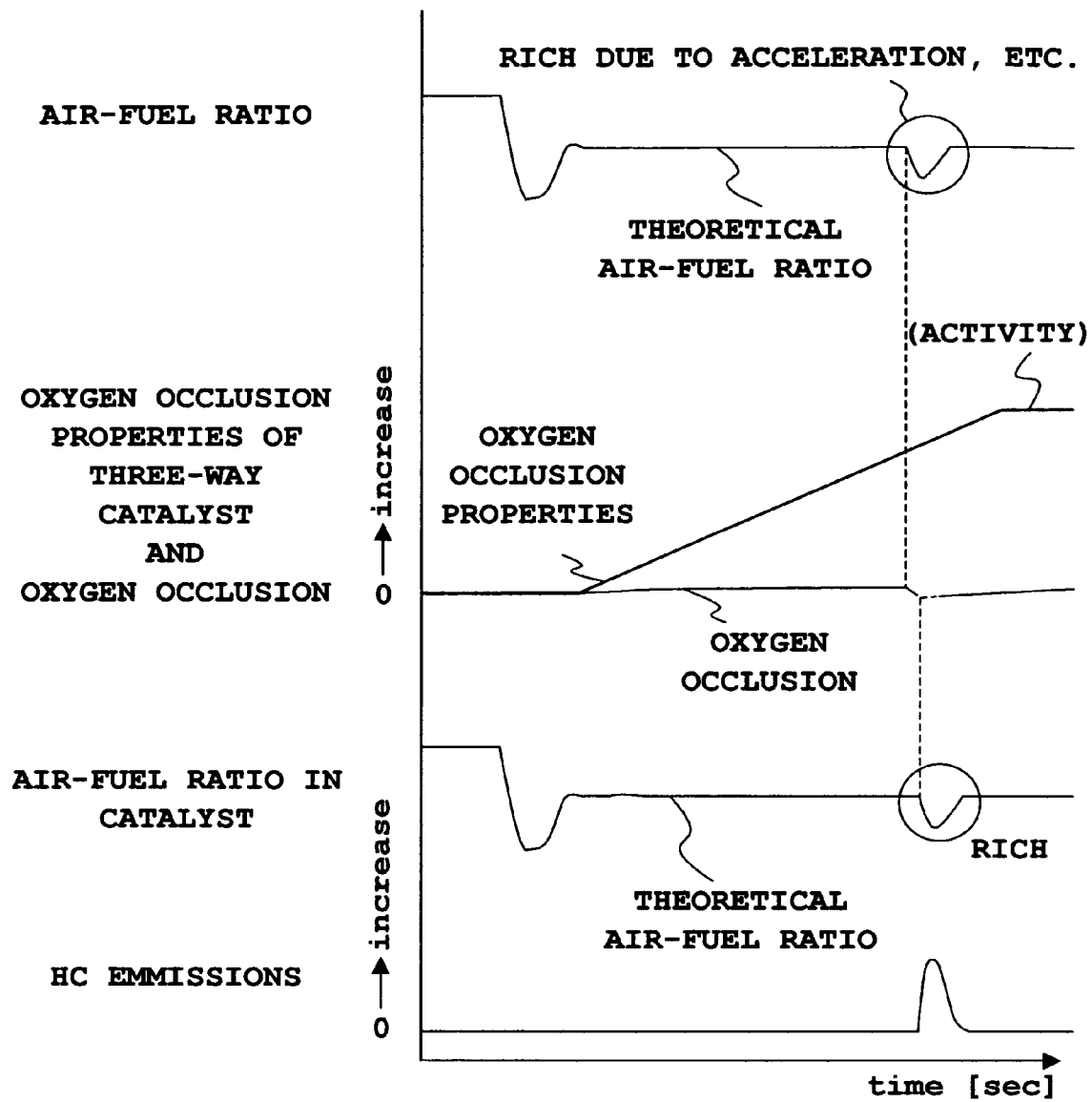
FIG. 12 is a chart showing problems in the conventional control.
Figure 13:
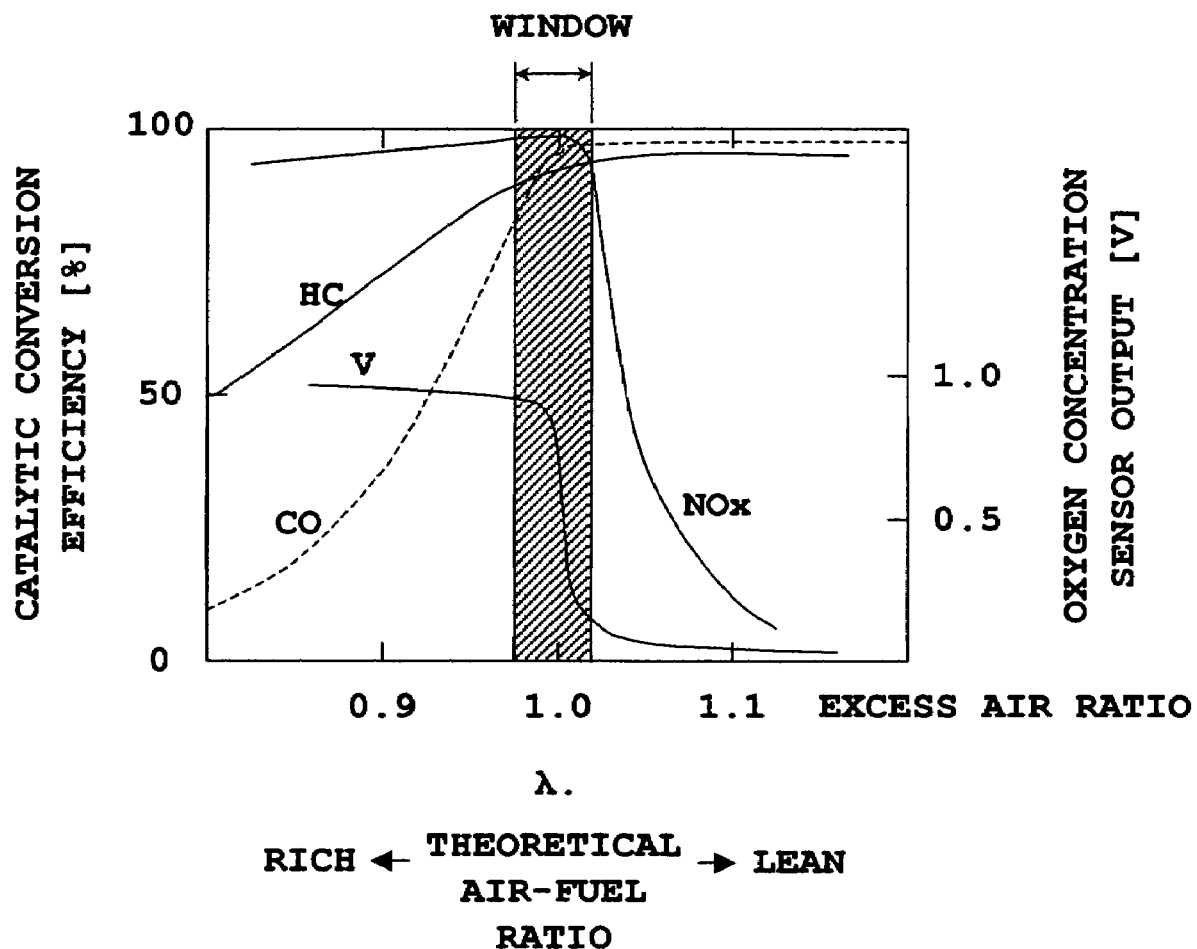
FIG. 13 is a characteristic chart showing the relation between an air-fuel ratio upstream from a three-way catalyst and a catalytic conversion rate.
Figure 14:
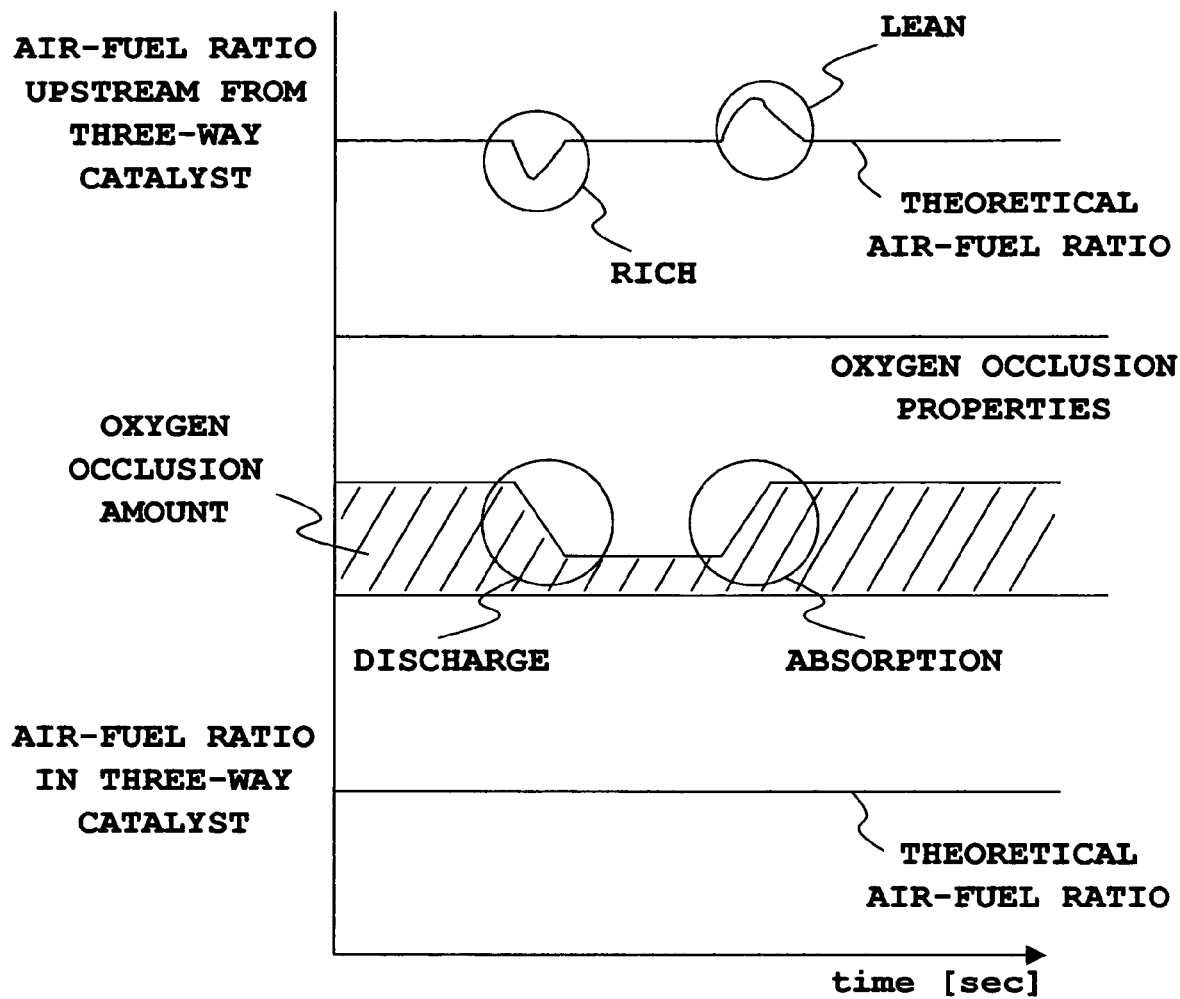
FIG. 14 is a characteristic chart showing the relation between air-fuel ratio upstream from the three-way catalyst, amount of oxygen occlusion, and air-fuel ratio in the three-way catalyst, respectively.
Figure 15:
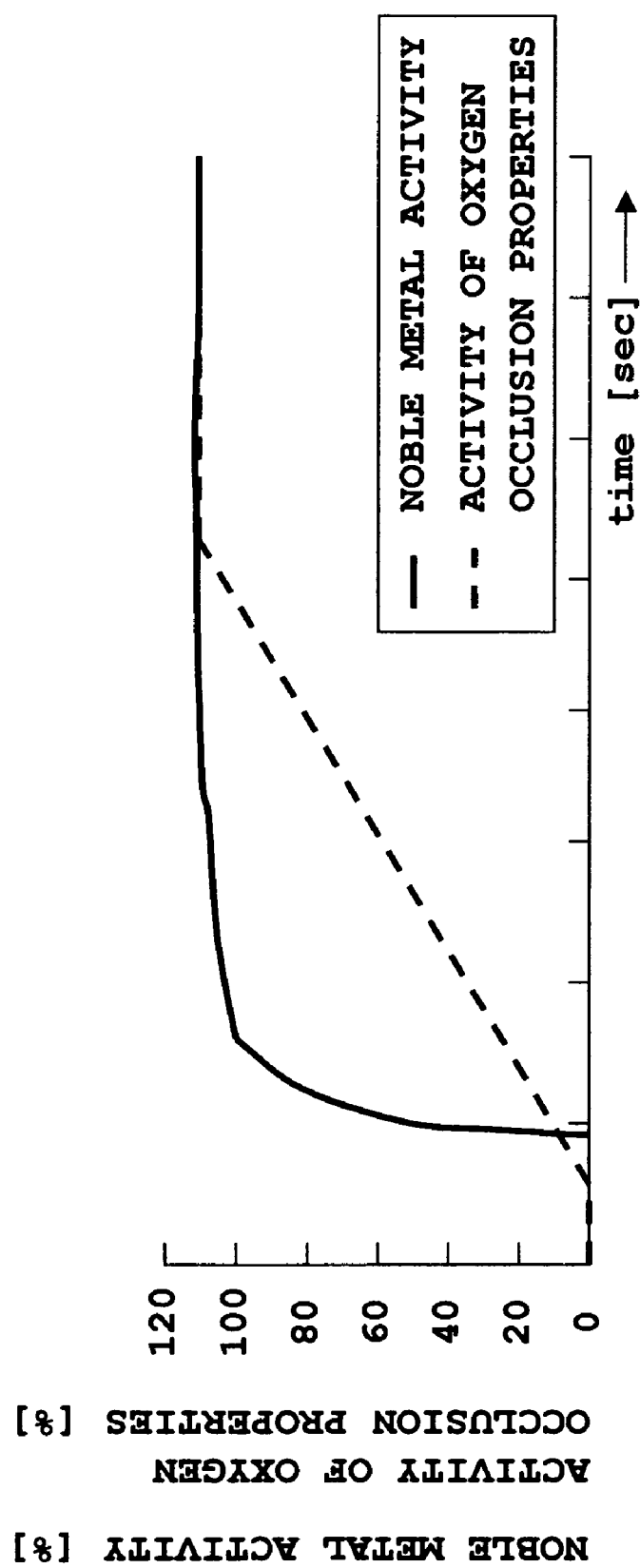
FIG. 15 is a characteristic chart showing a noble metal activity of a three-way catalyst and an oxygen occlusion properties activity after cold start of an internal combustion engine.

Subsequently, in Step S306 through Step S312, at time points when an activity of oxygen occlusion properties of the three-way catalyst is increased by a predetermined percentage, oxygen in accordance with an activity of oxygen occlusion properties is supplied to the three-way catalyst. In Step S306, to determine whether or not an activity of oxygen occlusion properties of a three-way catalyst is increased by a predetermined percentage, it is determined whether or not a difference between an activity (oscr) of oxygen occlusion properties of the three-way catalyst and the last value (oscr_old) having been stored in Step S308 is not less than a predetermined value. In the case of being determined to be not less than a predetermined value, a target oxygen supply (osctgt) is obtained from the activity (oscr) of oxygen occlusion properties of the catalyst based on FIG. 10 in Step S307.

Next in Step 309, to determine whether or not an oxygen supply to a three-way catalyst is within a predetermined amount of a target oxygen supply, it is determined whether or not a deviation of an oxygen supply (osc) from a target oxygen supply (osctgt) to a catalyst that is obtained in Step S307 is not more than a predetermined deviation (dosc). In the case of being not more than a predetermined deviation (dosc), the sufficient amount of oxygen is supplied to the catalyst, so that a target A/F (AFtgt) is set to be a theoretical air-fuel ratio (AFbse) in Step S311. On the other hand, in the case of not less than a predetermined deviation (dosc), an oxygen supply to the three-way catalyst with respect to an activity of oxygen occlusion properties of the three-way catalyst is insufficient. Then, in Step S310, a target A/F (AFtgt) is set to a lean air-fuel ratio (AFlean), and oxygen is actively supplied to the catalyst. Finally, in Step S312, a fuel compensation amount cfb with respect to a basic fuel injection time period TB is operated, returning to the main routine.

Additionally, in fuel injection quantity compensation amount operation routine of FIG. 9, when an activity of oxygen occlusion properties rise and reaches the saturation state, it is determined at all times to be not more than a predetermined value in Step S306, and it is determined to be not more than a predetermined deviation in Step S309. In Step S311, a target air-fuel ratio will be a theoretical air-fuel ratio on and from the moment, shifting to the warming-up state of the engine.

Results obtained by executing the flowchart of FIG. 9 are described with reference to a timing chart explaining operations quantity (osctgt) is operated at time points of a predetermined increase in activity (doscr) of oxygen occlusion properties of a catalyst. In the case where an oxygen supply (osc) to the catalyst is less than a value obtained by the subtraction of a predetermined deviation (dosc) from a target oxygen supply (osctgt), a target A/F (AFtgt) is set to a lean air-fuel ratio (AFlean), and an air-fuel ratio continues to be lean until an oxygen supply (osc) that is operated from an airflow rate (qa) and an air-fuel ratio (Iaf) comes to be within a predetermined deviation (dosc) from a target oxygen supply (osctgt) that is calculated from an activity (oscr) of oxygen occlusion properties of a catalyst. Thus, an appropriate amount of excess oxygen in accordance with an activity of oxygen occlusion properties of the three-way catalyst can be supplied, so that the same effect as in the foregoing first and second embodiments can be obtained.

As described above, according to the third embodiment, a target air-fuel ratio is set to be more lean than a theoretical air-fuel ratio until being an oxygen supply having been preliminarily determined at time points of a predetermined increase in activity of oxygen occlusion properties, thus enabling to supply oxygen in accordance with the activity of oxygen occlusion properties of the three-way catalyst. Consequently, it is possible to provide improved catalytic action despite the occurrence of being rich due to, e.g., acceleration while suppressing worse NOx emissions, thus enabling to suppress worse HC emissions.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A control device of an internal combustion engine comprising:
   a three-way catalyst disposed in an exhaust passage of an internal combustion engine;
   basic fuel injection quantity operation means for operating a basic fuel injection quantity;
   fuel injection quantity compensation amount operation means for operating a compensation amount of said basic fuel injection quantity so that an air-fuel ratio upstream from said three-way catalyst is coincident with a target air-fuel ratio;
   fuel injection quantity operation means for operating a fuel injection quantity that is obtained by the compensation of said basic fuel injection quantity with said basic fuel injection quantity compensation amount;
   oxygen occlusion properties activity detection means for detecting an activity of oxygen occlusion properties of said three-way catalyst; and
   target air-fuel ratio operation means for setting said target air-fuel ratio based on the activity of oxygen occlusion properties that is obtained by said oxygen occlusion properties activity detection means,
   wherein said target air-fuel ratio operation means causes a target air-fuel ratio to be more lean than a theoretical air-fuel ratio during a predetermined time period at time points of a predetermined increase in activity of oxygen occlusion properties.

2. The control device of an internal combustion engine according to claim 1, further comprising: intake air detection means for detecting an air intake quantity of an internal combustion engine, and air intake integration means for integrating said intake air quantity;
   wherein said oxygen occlusion properties activity detection means operates an activity of oxygen occlusion properties from an integrated value of said intake air quantity.

3. The control device of an internal combustion engine according to claim 1, further comprising fuel injection quantity integration means for integrating said fuel injection quantity;
   wherein said oxygen occlusion properties activity detection means operates an activity of oxygen occlusion properties from an integrated value of said fuel injection quantity.

4. The control device of an internal combustion engine according to claim 1, wherein said oxygen occlusion properties activity detection means determines an integrated air quantity and detects the activity of oxygen occlusion properties by accessing a reference table storing a correlation between the integrated air quantity and the activity of oxygen occlusion properties.

5. The control device of an internal combustion engine according to claim 1, wherein said oxygen occlusion properties activity detection means detects the activity of oxygen occlusion properties by accessing a reference table storing a correlation between the integrated value of said fuel injection quantity and the activity of oxygen occlusion properties.

6. The device of an internal combustion engine according to claim 1, wherein said target air-fuel ratio operation means switches said target air-fuel ratio from a theoretical air-fuel ratio to a lean air-fuel ratio depending on the detected activity of the oxygen occlusion properties.

7. The device of an internal combustion engine according to claim 1, wherein said target air-fuel ratio operation means deviates said target air-fuel ratio from a theoretical air-fuel ratio in a period after a cold start of the internal combustion engine.

8. The control device of an internal combustion engine according to claim 1, wherein said oxygen occlusion properties activity detection means determines the activity of oxygen occlusion properties from an integrated value of said intake air quantity calculated based on air flow rate, engine speed, a boost pressure, and a preset time interval.

9. The control device of an internal combustion engine according to claim 8, wherein said oxygen occlusion properties activity detection means detects the activity of oxygen occlusion properties by accessing a reference table storing a correlation between the integrated air quantity and the activity of oxygen occlusion properties.

10. A control device of an internal combustion engine comprising:
- a three-way catalyst disposed in an exhaust passage of an internal combustion engine;
- basic fuel injection quantity operation means for operating a basic fuel injection quantity;
- fuel injection quantity compensation amount operation means for operating a compensation amount of said basic fuel injection quantity so that an air-fuel ratio upstream from said three-way catalyst is coincident with a target air-fuel ratio;
- fuel injection quantity operation means for operating a fuel injection quantity that is obtained by the compensation of said basic fuel injection quantity with said basic fuel injection quantity compensation amount;
- oxygen occlusion properties activity detection means for detecting an activity of oxygen occlusion properties of said three-way catalyst; and
- target air-fuel ratio operation means for setting said target air-fuel ratio based on the activity of oxygen occlusion properties that is obtained by said oxygen occlusion properties activity detection means; and
- an oxygen supply operation means for operating an oxygen supply to said three-way catalyst from an air-fuel ratio upstream from said three-way catalyst and an air intake quantity,
- wherein said target air-fuel ratio operation means causes a target air-fuel ratio to be more lean than a theoretical air-fuel ratio until being an oxygen supply having been preliminarily determined at time points of a predetermined increase in activity of oxygen occlusion properties.

11. A method for controlling fuel injection in an internal combustion engine comprising:
- calculating a basic fuel injection quantity into the internal combustion engine;
- calculating a compensation amount of said basic fuel injection quantity so that an air-fuel ratio upstream from a three-way catalyst disposed in an exhaust passage of the internal combustion engine is coincident with a target air-fuel ratio;
- calculating a fuel injection quantity that is obtained by the compensation of said basic fuel injection quantity with said basic fuel injection quantity compensation amount;
- detecting an activity of oxygen occlusion properties of said three-way catalyst;
- setting said target air-fuel ratio based on the detected activity of oxygen occlusion properties; and
- supplying fuel to the internal combustion engine based on the set target air-fuel ratio,
- wherein said target air-fuel ratio is adjusted to be more lean than a theoretical air-fuel ratio during a predetermined time period at time points of a predetermined increase in activity of oxygen occlusion properties.

* * * * *